US012674978B2

(12) United States Patent
Kobayashi et al.

(10) Patent No.: US 12,674,978 B2
(45) Date of Patent: Jul. 7, 2026

(54) OPTICAL SYSTEM AND DISPLAY APPARATUS

(71) Applicant: CANON KABUSHIKI KAISHA, Tokyo (JP)

(72) Inventors: Yuma Kobayashi, Tochigi (JP); Yu Miyajima, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 279 days.

(21) Appl. No.: 18/531,899

(22) Filed: Dec. 7, 2023

(65) Prior Publication Data

US 2024/0210676 A1 Jun. 27, 2024

(30) Foreign Application Priority Data

Dec. 27, 2022 (JP) ................................. 2022-209810

(51) Int. Cl.

| | |
|---|---|
| *G02B 5/18* | (2006.01) |
| *G02B 27/00* | (2006.01) |
| *G02B 27/01* | (2006.01) |
| *G02B 27/09* | (2006.01) |
| *G02B 27/42* | (2006.01) |

(52) U.S. Cl.
CPC ....... *G02B 27/0081* (2013.01); *G02B 5/1866* (2013.01); *G02B 27/0101* (2013.01); *G02B 27/0172* (2013.01); *G02B 27/0944* (2013.01); *G02B 27/4211* (2013.01); *G02B 27/4216* (2013.01); *G02B 2027/011* (2013.01); *G02B 2027/0116* (2013.01); *G02B 2027/0123* (2013.01)

(58) Field of Classification Search
None
See application file for complete search history.

(56) References Cited

U.S. PATENT DOCUMENTS

| | | | |
|---|---|---|---|
| 10,012,938 B2 | 7/2018 | Miyajima |
| 10,054,790 B2 | 8/2018 | Miyajima |
| 10,401,770 B2 | 9/2019 | Miyajima |
| 10,670,984 B2 | 6/2020 | Miyajima |
| 10,754,148 B2 | 8/2020 | Miyajima |
| 10,761,450 B2 | 9/2020 | Miyajima |
| 10,908,544 B2 | 2/2021 | Miyajima |
| 11,381,703 B2 | 7/2022 | Miyajima |

(Continued)

FOREIGN PATENT DOCUMENTS

JP 2019-503514 A 2/2019

*Primary Examiner* — Derek S. Chapel
(74) *Attorney, Agent, or Firm* — Carter, DeLuca & Farrell LLP

(57) ABSTRACT

An optical system through which a light beam from an image display element is guided to an exit pupil includes first and second transmissive reflective surfaces, and first and second optical elements. The first optical element includes a first optical part made of a first optical material, and a second optical part made of a second optical material different from the first optical material that are disposed in order from the exit pupil side to the image display element side. The first optical part and the second optical part are cemented to each other and a diffraction grating is formed on a cemented surface of the first and second optical parts. Predetermined inequalities are satisfied.

20 Claims, 10 Drawing Sheets

(56)          References Cited

U.S. PATENT DOCUMENTS

| 2011/0304916 | A1* | 12/2011 | Ushigome | G02B 27/4272 |
| | | | | 359/576 |
| 2016/0202393 | A1 | 7/2016 | Miyajima | |
| 2021/0157040 | A1* | 5/2021 | Matsumoto | G02B 5/1842 |
| 2022/0066218 | A1* | 3/2022 | Saito | G02B 27/0172 |
| 2023/0244065 | A1 | 8/2023 | Kobayashi | |
| 2024/0019691 | A1 | 1/2024 | Miyajima | |
| 2024/0210700 | A1 | 6/2024 | Miyajima | |
| 2024/0248300 | A1 | 7/2024 | Yarita | |
| 2024/0248321 | A1 | 7/2024 | Kobayashi | |

* cited by examiner

OPTICAL SYSTEM AND DISPLAY APPARATUS

BACKGROUND

Technical Field

One of the aspects of the embodiments relates to an optical system and is suitable for a display apparatus that displays, in an enlarged manner for observation, an original image displayed on an image display element such as a head mount display (TIMID).

Description of Related Art

Conventionally, it has been required to shorten the overall length of an optical system provided in a display apparatus such as an HMD. A bending optical system has been known as an optical system the overall length of which can be shortened (refer to PCT Domestic Publication No. 2019-503514).

The bending optical system tends to have a large lateral chromatic aberration, and thus the fineness of an image degrades. Use of a diffractive optical element is effective for correcting the lateral chromatic aberration, but it is highly difficult to produce the diffractive optical element, and in particular, it is difficult to produce a grating transfer mold used to mold a diffraction grating when aberration correction and thickness reduction are to be achieved.

The present disclosure is intended to provide an optical system and a display apparatus that are easy to manufacture and have high optical performance.

SUMMARY

An optical system according to one aspect of the embodiment through which a light beam from an image display element is guided to an exit pupil includes a first transmissive reflective surface and a second transmissive reflective surface that are disposed in order from an exit pupil side to an image display element side, and a first optical element and a second optical element that are disposed in order from the exit pupil side to the image display element side. The first optical element includes a first optical part made of a first optical material, and a second optical part made of a second optical material different from the first optical material that are disposed in order from the exit pupil side to the image display element side. The first optical part and the second optical part are cemented to each other and a diffraction grating is formed on a cemented surface of the first and second optical parts. The following inequality is satisfied:

$$1000 < H \times N < 10000$$

where H [μm] is an average grating height of the diffraction grating and N is the number of annuli of the diffraction grating. A display apparatus having the above optical system also constitutes another aspect of the embodiment.

Further features of the disclosure will become apparent from the following description of embodiments with reference to the attached drawings.

DESCRIPTION OF THE EMBODIMENTS

Figure 1:
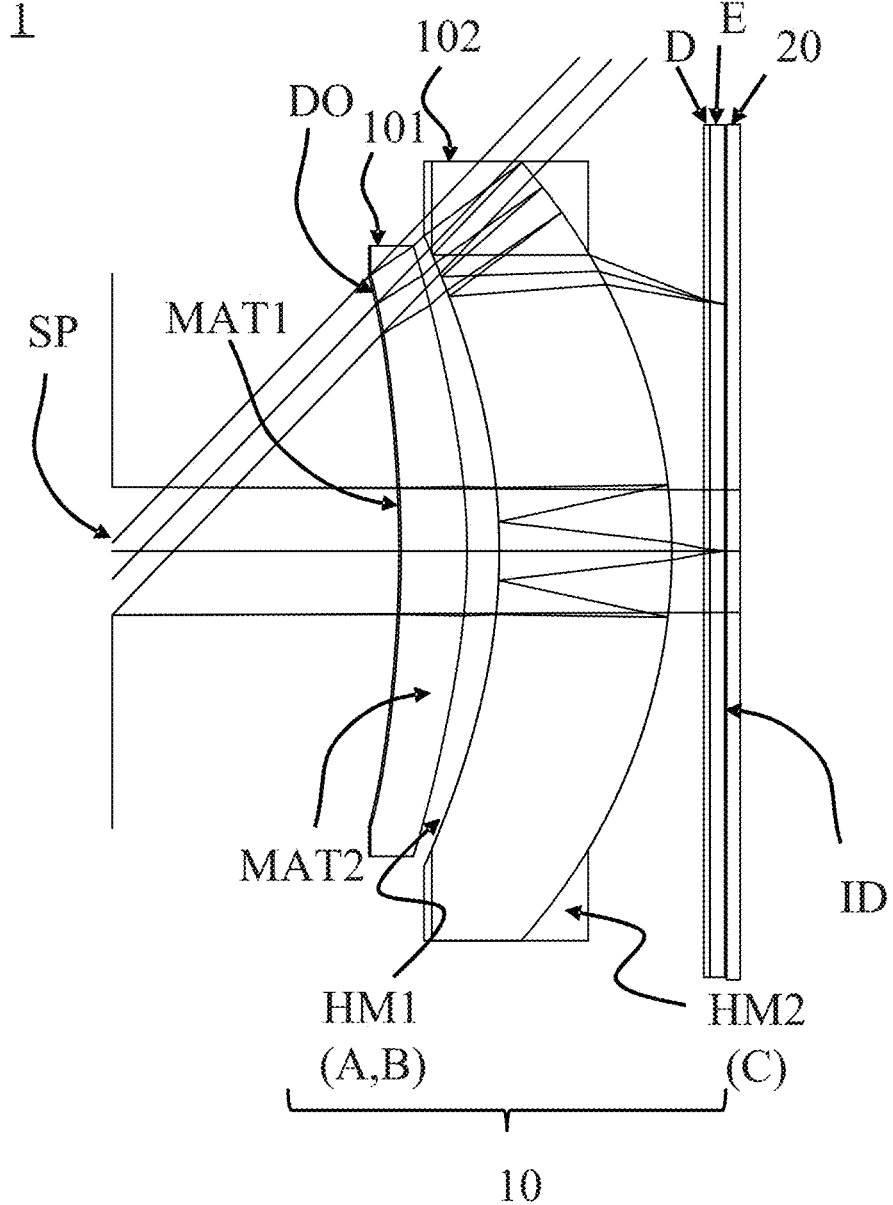
FIG. 1 is a sectional view of an observation apparatus including an observation optical system according to Example 1.

Referring now to the accompanying drawings, a detailed description will be given of embodiments according to the disclosure. Corresponding elements in respective figures will be designated by the same reference numerals, and a duplicate description thereof will be omitted.

Figure 3:
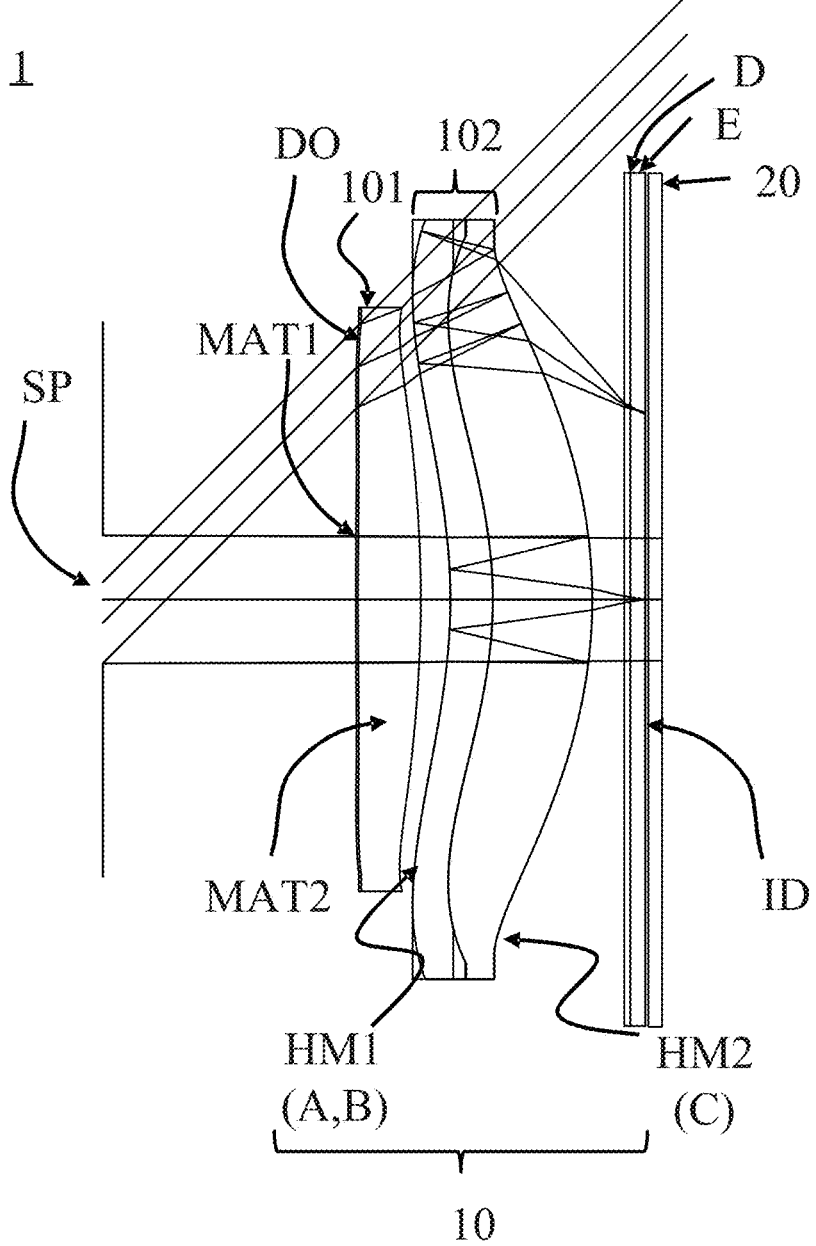
FIG. 3 is a sectional view of an observation apparatus including an observation optical system according to Example 2.
Figure 5:
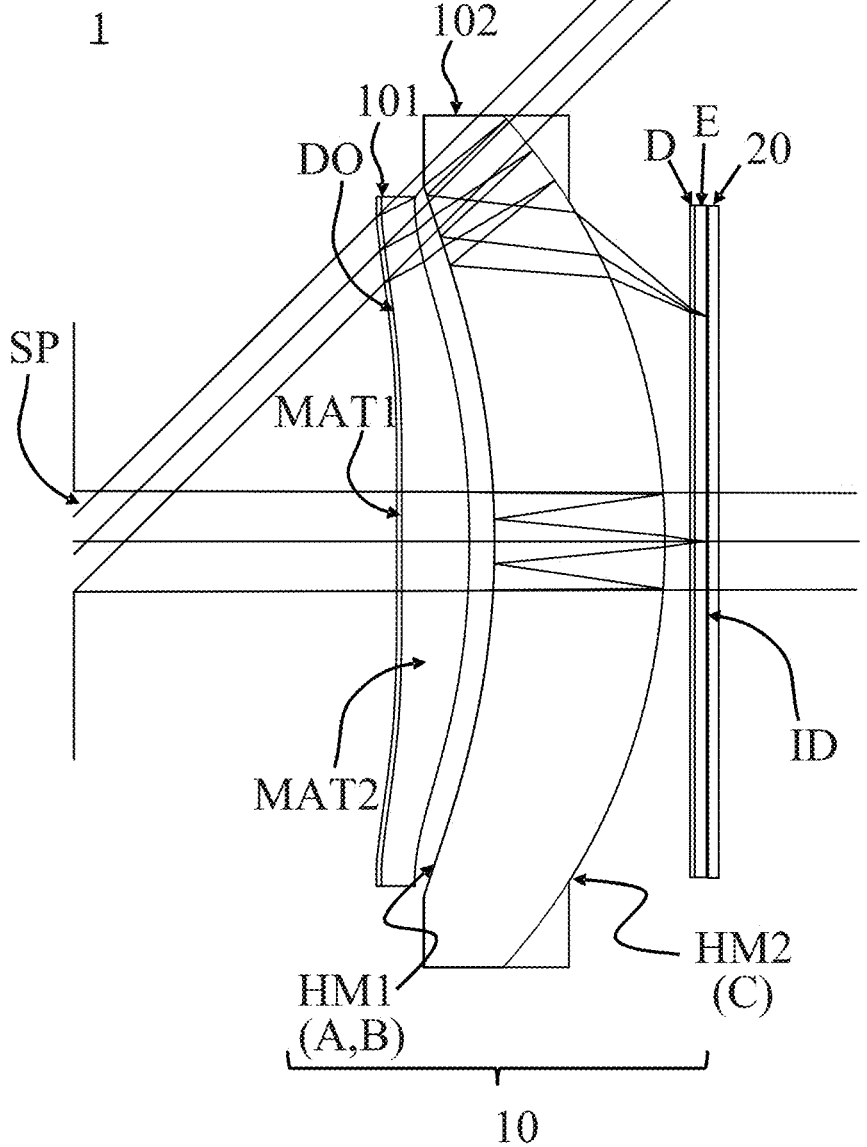
FIG. 5 is a sectional view of an observation apparatus including an observation optical system according to Example 3.

FIGS. 1, 3, and 5 are each a sectional view of an observation apparatus (display apparatus) 1 including an observation optical system (optical system) 10 according to Example 1, 2, or 3. The observation apparatus 1 includes an observation optical system 10 and an image display element (light modulator) 20. The observation optical system 10 is an optical system through which a light beam from the image display element 20 is guided to an exit pupil and an optical image of an original picture displayed on an image display surface ID of the image display element 20 can be observed from a user's pupil surface SP where the exit pupil is positioned. The image display element 20 is, for example, a liquid crystal display element (LCD) or an organic EL element. The observation optical system 10 includes, in order from the pupil surface SP side to the image display surface ID side, a first half-transmissive surface (first transmissive reflective surface) HM1 and a second half-transmissive surface (second transmissive reflective surface) HM2.

Figure 2:
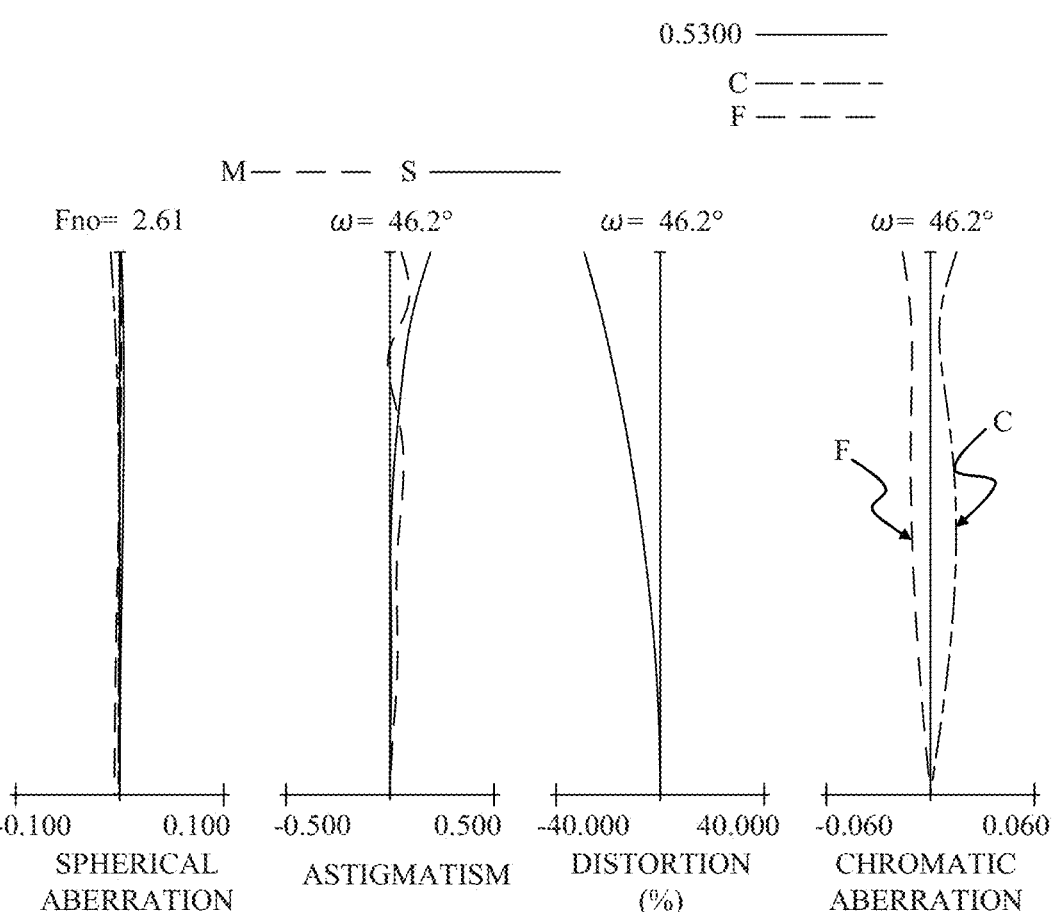
FIG. 2 is an aberration diagram of the observation optical system according to Example 1.
Figure 4:
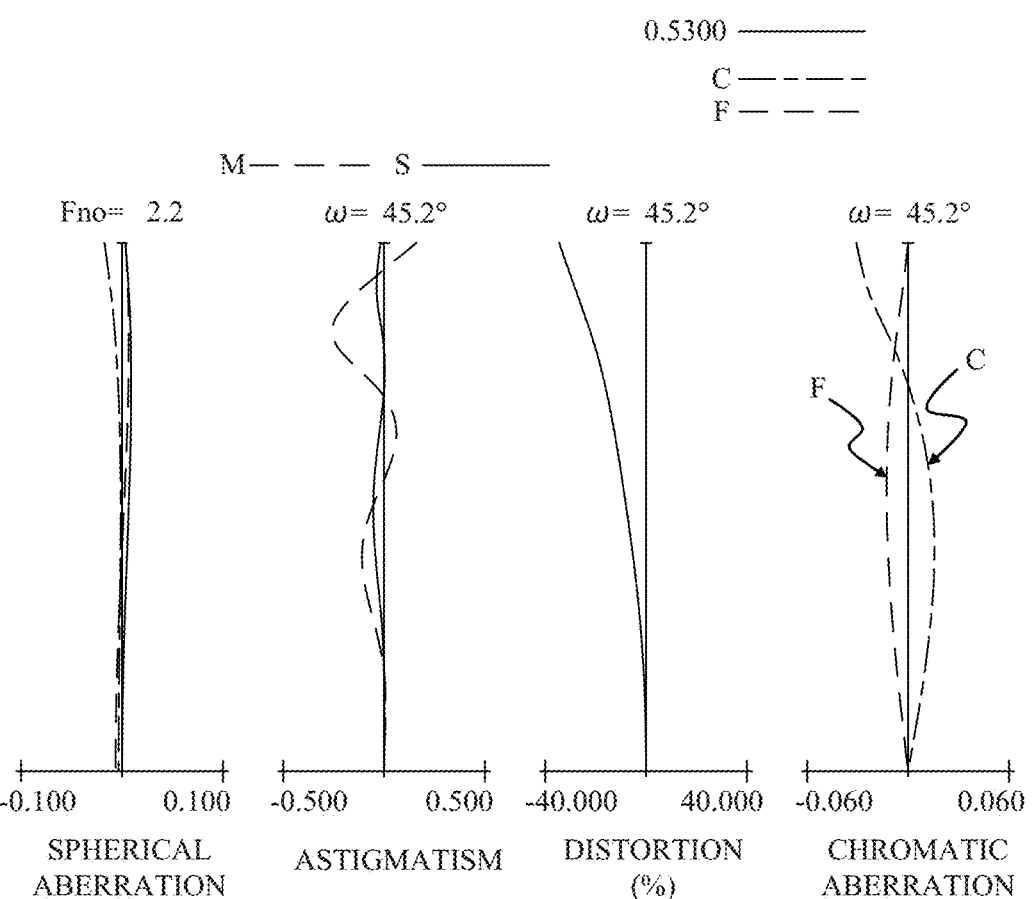
FIG. 4 is an aberration diagram of the observation optical system according to Example 2.
Figure 6:
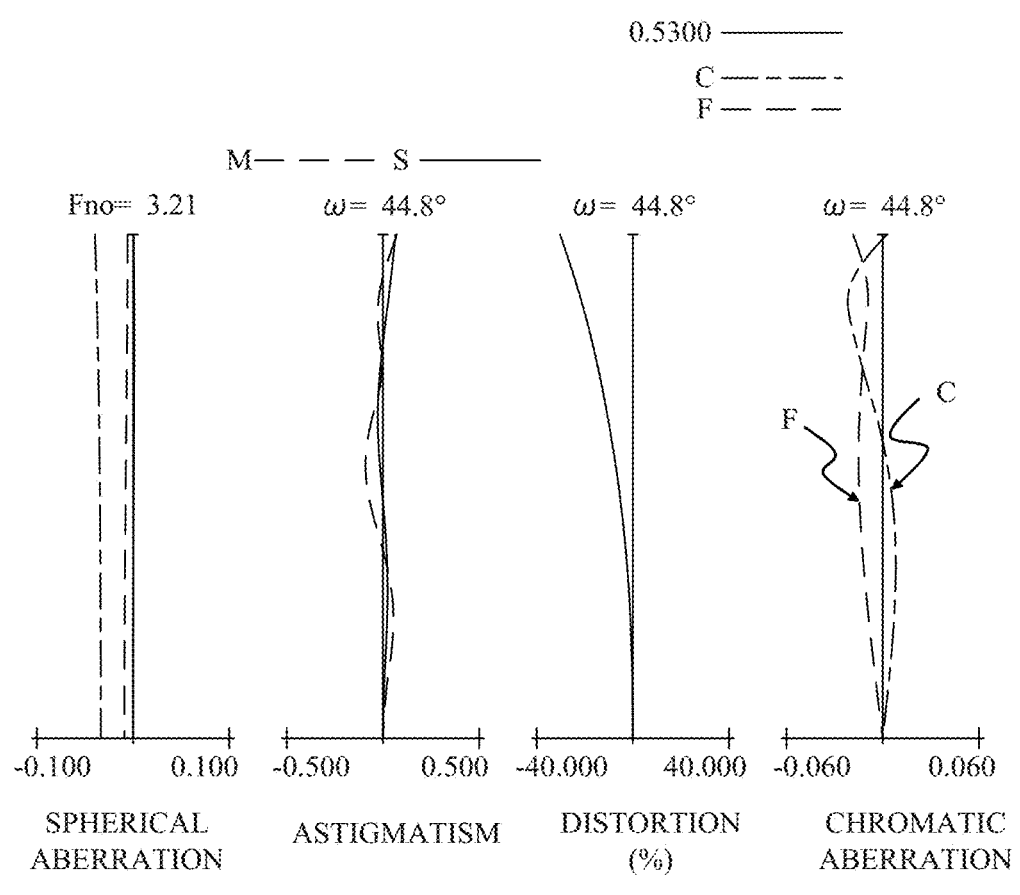
FIG. 6 is an aberration diagram of the observation optical system according to Example 3.

FIGS. 2, 4, and 6 are each an aberration diagram of the observation optical system 10 according to Example 1, 2, or 3. In the observation optical system 10 according to each example, the aberration of a light beam having reached the pupil surface SP from a light emission point provided on on the image display surface ID side corresponds in a one-to-one relation to the aberration of a light beam having reached the image display surface ID from a light emission point provided on the pupil surface SP side. Thus, the aberration of a light beam having reached the image display surface ID is evaluated in each example. FIG. 2 is an aberration diagram of a case where an eye relief (interval on the optical axis between the pupil surface SP and a surface of an optical element disposed closest to the pupil surface SP, the surface being positioned on the pupil surface SP side) is 13.4 mm and a virtual image is displayed at a position separated from the pupil by 1612 mm. FIG. 4 is an aberration diagram of a case where the eye relief is 11.8 mm and a virtual image is displayed at a position separated from the pupil by 1612 mm. FIG. 6 is an aberration diagram of a case where the eye relief is 19.2 mm and a virtual image is displayed at a position separated from the pupil by 1612 mm.

In a spherical aberration diagram, Fno represents F-number and spherical aberration amounts for the C line (wavelength 656.3 nm) and the F line (wavelength 486.1 nm) are illustrated. In an astigmatism diagram, S illustrates an astigmatism amount at the sagittal image plane and M illustrates an astigmatism amount at the meridional image plane. In a distortion diagram, a distortion amount for the wavelength of 530 nm is illustrated. In a chromatic aberration diagram, chromatic aberration amounts for the C-line and the F-line are illustrated. The symbol $\omega$ represents image capturing half view angle (°).

Figure 11:
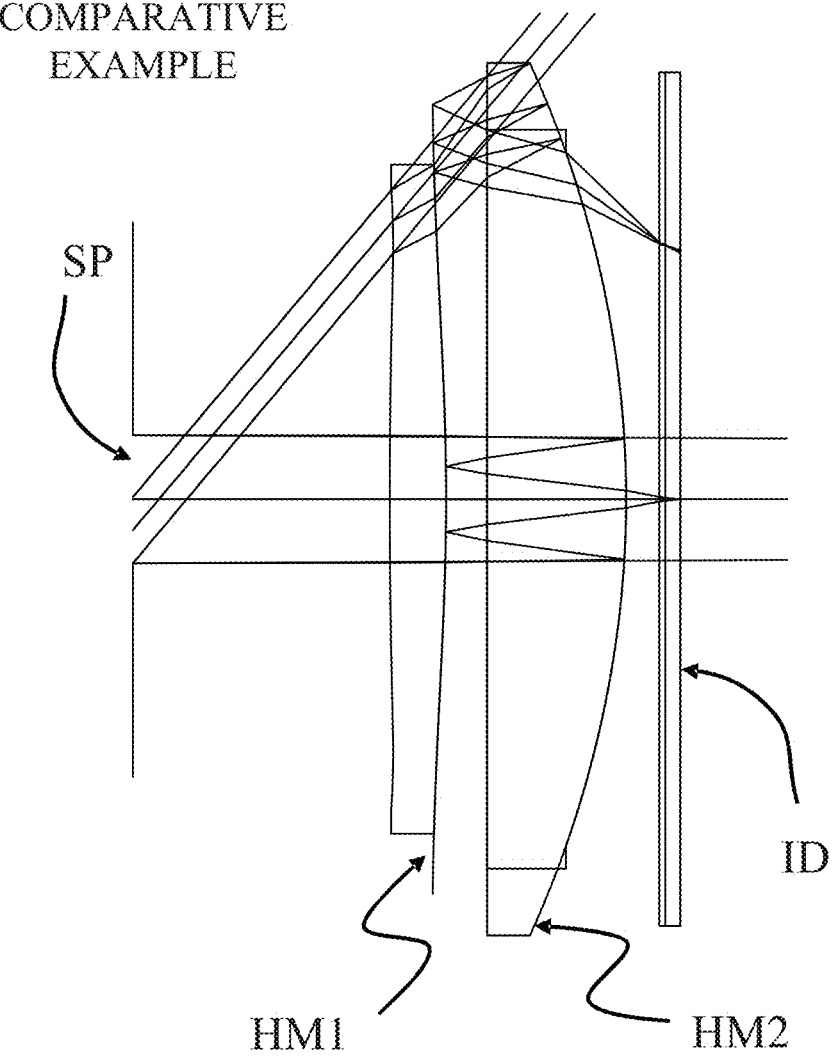
FIG. 11 is a sectional view of an observation apparatus including an observation optical system according to a comparative example.
Figure 12:
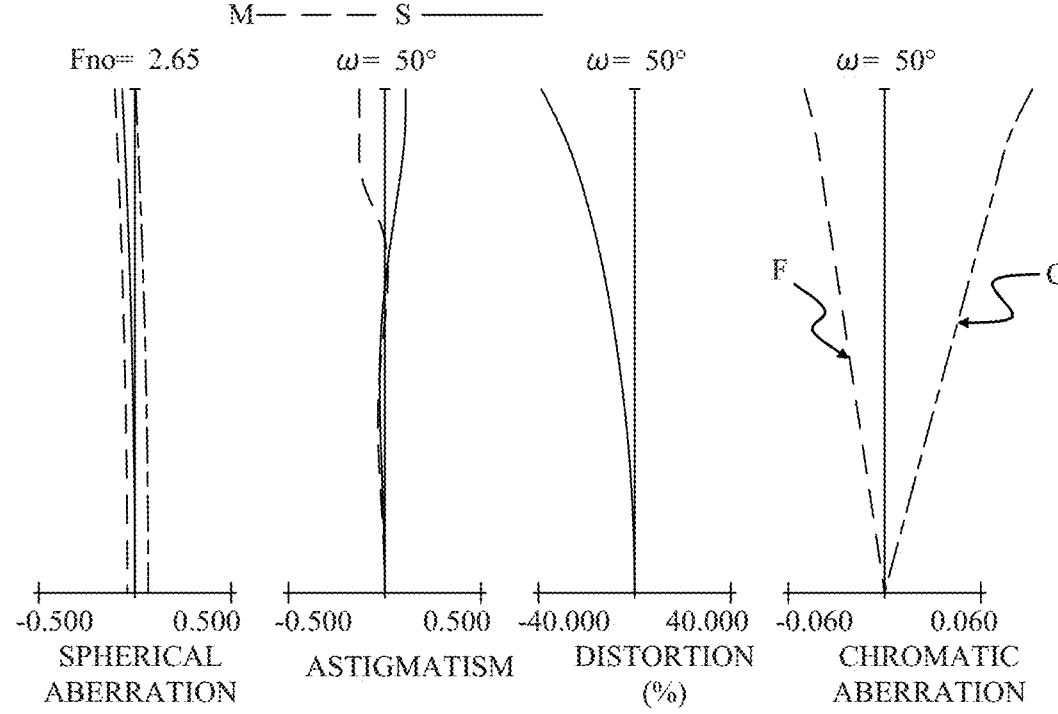
FIG. 12 is an aberration diagram of the observation optical system of the comparative example.

FIG. 11 is a sectional view of an observation apparatus including an observation optical system of a comparative example. FIG. 12 is an aberration diagram of the observation optical system of the comparative example in a case where the eye relief is 12.0 mm and a virtual image is displayed at a position separated from the pupil by 1612 mm. FIG. 12 illustrates aberration diagrams for the C-line, the F-line, and the wavelength of 530 nm like the aberration diagrams according to each example, but the observation optical system according to the comparative example includes no diffractive optical element, and thus large lateral chromatic aberration occurs and image quality degrades.

In a case where an organic light emitting diode (OLED), an LCD, or the like is used as the image display element 20, the image display element 20 may be provided with electric processing in accordance with the distortion amount and the lateral chromatic aberration amount.

Figure 7:
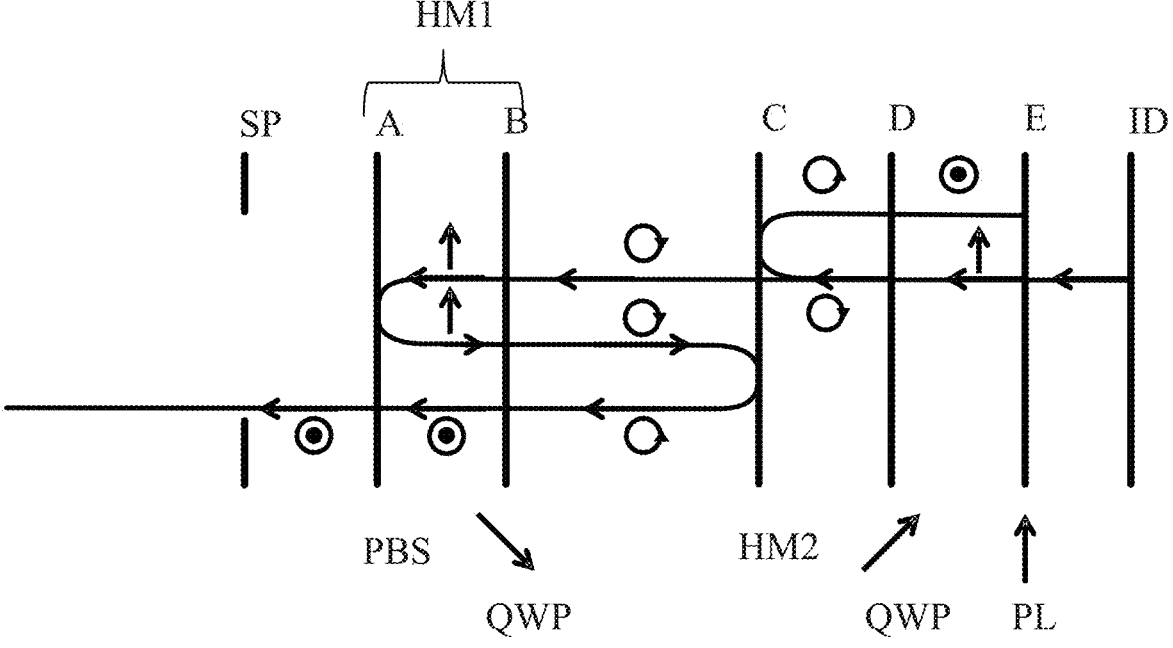
FIG. 7 is a schematic diagram illustrating the optical path of an observation optical system.

The optical path of the observation optical system 10 will be described below with reference to FIG. 7. FIG. 7 is a schematic diagram illustrating the optical path of the observation optical system 10. The observation optical system 10 includes, in order from the pupil surface SP side to an image display element 103 side, a first optical element 101, a polarization-selective half-transmissive reflective element (PBS) A, a first quarter waveplate B, a second optical element 102, a second quarter waveplate D, and a polarization plate E. Each optical element is, for example, a lens. The surface of the second optical element 102 on the image display element 20 side functions as a half-transmissive reflective surface (half-reflective mirror) C. In the observation optical system 10 according to each example, the polarization-selective half-transmissive reflective element A and the first quarter waveplate B function as the first half-transmissive surface HM1, and the half-transmissive reflective surface C functions as the second half-transmissive surface HM2. The half-transmissive reflective surface C does not necessarily need to have transmittance and reflectance that are equal to each other but may have transmittance and reflectance that are different from each other as necessary. In each example, the first half-transmissive surface HM1 and the second half-transmissive surface HM2 are provided at the second optical element 102, but the present example is not limited to this configuration. The first half-transmissive surface HM1 may be provided at the first optical element 101 and the second half-transmissive surface HM2 may be provided at the second optical element 102, or the first half-transmissive surface HM1 and the second half-transmissive surface HM2 may be provided at the first optical element 101.

The polarization-selective half-transmissive reflective element A reflects linearly polarized light having the same polarization direction as in a case of passing through the polarization plate E and transmits linearly polarized light having a polarization direction orthogonal to this same polarization direction. The polarization-selective half-transmissive reflective element A is, for example, a wire grid polarizer or a laminated birefringent film polarizer. For example, in a case where the polarization-selective half-transmissive reflective element A is a wire grid polarizer, a wire grid formation surface functions as a half-transmissive surface. The grid of a wire grid may be formed by mold injection. The grid may be integrally molded with a lens. The first quarter waveplate B is disposed in a state in which the slow axis is tilted relative to the slow axis of the second quarter waveplate D by 900 and the slow axis is tilted relative to the polarization transmission axis of the polarization plate E by 45°. The half-transmissive reflective surface C is, for example, formed of a dielectric multi-layered film or by metal evaporation coating.

The polarization plate E may be integrated with the image display surface ID. For example, a liquid crystal display element includes a polarization plate in its configuration. An organic EL element includes a polarization plate for reflection prevention in some cases. In such a case, light from the image display element 103 is already linearly polarized, and thus the polarization plate E does not necessarily need to be provided.

With such a configuration, light output from the image display surface ID transmits through the polarization plate E and becomes linearly polarized light, transmits through the second quarter waveplate D and becomes circularly polarized light, and enters the half-transmissive reflective surface C. Part of the light incident on the half-transmissive reflective surface C is reflected by the half-transmissive reflective surface C, becomes circularly polarized light in the opposite direction, and returns to the second quarter waveplate D. The light circularly polarized light in the opposite direction that has returned to the second quarter waveplate D transmits through the second quarter waveplate D and becomes linearly polarized light having a polarization direction orthogonal to the polarization direction when first transmitting through the polarization plate E, returns to the polarization plate E, and is absorbed by the polarization plate E.

The rest of the light incident on the half-transmissive reflective surface C transmits through the half-transmissive reflective surface C, transmits through the first quarter waveplate B, becomes linearly polarized light having the same polarization direction as the polarization direction when transmitting through the polarization plate E, and enters the polarization-selective half-transmissive reflective element A. The linearly polarized light incident on the polarization-selective half-transmissive reflective element A is reflected by the polarization-selective half-transmissive reflective element A in accordance with the polarization selectivity of the polarization-selective half-transmissive reflective element A. The light reflected by the polarization-selective half-transmissive reflective element A transmits through the first quarter waveplate B and becomes circularly polarized light having a polarization direction opposite to that when first converted into circularly polarized light by the second quarter waveplate D, enters the half-transmissive reflective surface C, and is reflected by the half-transmissive reflective surface C. The light reflected by the half-transmissive reflective surface C becomes circularly polarized light having a polarization direction opposite to that of the pre-reflection light, transmits through the first quarter waveplate B, becomes linearly polarized light having a polarization direction orthogonal to the polarization direction when first transmitting through the polarization plate E, and enters the polarization-selective half-transmissive reflective element A. The linearly polarized light incident on the polarization-selective half-transmissive reflective element A transmits through the polarization-selective half-transmissive reflective element A in accordance with the polarization selectivity of the polarization-selective half-transmissive reflective element A, and is guided to the pupil surface SP.

Thus, in the observation optical system according to each example, among light output from the image display surface ID, only light that has transmitted through the second half-transmissive surface HM2, been reflected by the first half-transmissive surface HM1, been reflected by the second half-transmissive surface HM2, and transmitted through the first half-transmissive surface HM1 is guided to the pupil surface SP.

A polarization plate having a transmission axis aligned with that of the polarization-selective half-transmissive reflective element A may be disposed between the polarization-selective half-transmissive reflective element A and the pupil surface SP. This polarization plate can prevent external light from entering the pupil upon reflection at the polarization-selective half-transmissive reflective element A and becoming ghost or flare.

The half-transmissive reflective surface C may function as the first half-transmissive surface HM1, and the polarization-selective half-transmissive reflective element A and the first quarter waveplate B may function as the second half-transmissive surface HM2. In this case, the half-transmissive reflective surface C, the first quarter waveplate B, the polarization-selective half-transmissive reflective element A, and the polarization plate E may be arranged in order from the pupil surface SP side to the image display element 103 side and the second quarter waveplate D is unnecessary. Light progression and polarization in the half-transmissive reflective surface C, the first quarter waveplate B, and the polarization-selective half-transmissive reflective element A trace, in the opposite direction, the light progression and polarization in the polarization-selective half-transmissive reflective element A, the first quarter waveplate B, and the half-transmissive reflective surface C, which has been described with reference to FIG. 7. In addition, a polarization plate and a quarter waveplate may be arranged between the pupil surface SP and the half-transmissive reflective surface C in order from the pupil surface side to the image display element 103 side. This polarization plate and the quarter waveplate can prevent external light from entering the pupil upon reflection at the half-transmissive reflective surface C and becoming ghost or flare.

A description will now be given of a characteristic configuration of the observation optical system 10 according to each example.

The first optical element 101 includes a first optical part MAT1 made of a first optical material and a second optical part MAT2 made of a second optical material different from the first optical material in order from the exit the pupil side to the image display element 20 side.

The first optical part MAT1 and the second optical part MAT2 are cemented to each other, and a diffraction grating DO is formed at their cemented surface. In other words, the first optical element 101 is a diffractive optical element. In each example, a brazed transmission diffraction grating is used as the diffraction grating DO.

The observation optical system 10 according to each example satisfies the following inequality (1).

6

$$H \times N < 10000 \tag{1}$$

where H [μm] is an average grating height of the diffraction grating DO, and N is the number of annuli of the diffraction grating DO.

Figure 8:
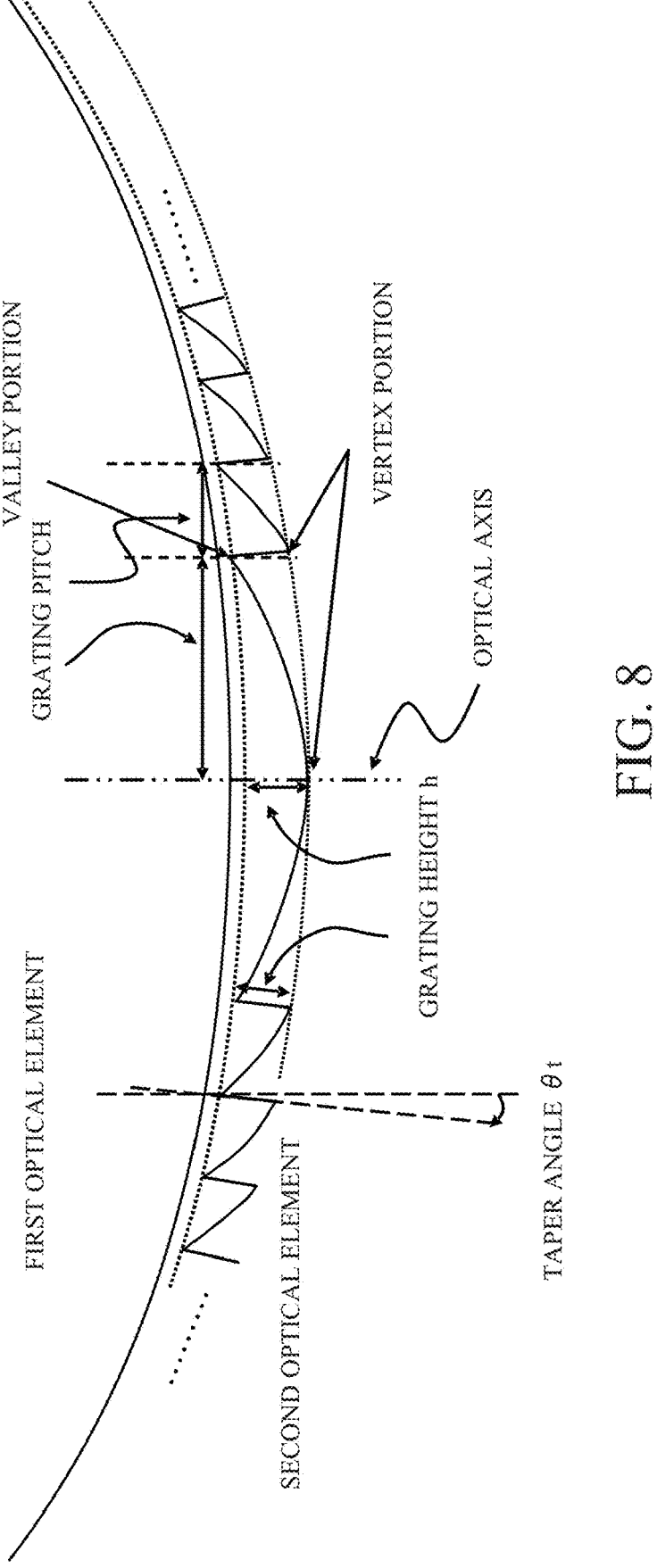
FIG. 8 is a schematic sectional view of a diffraction grating.
Figure 9:
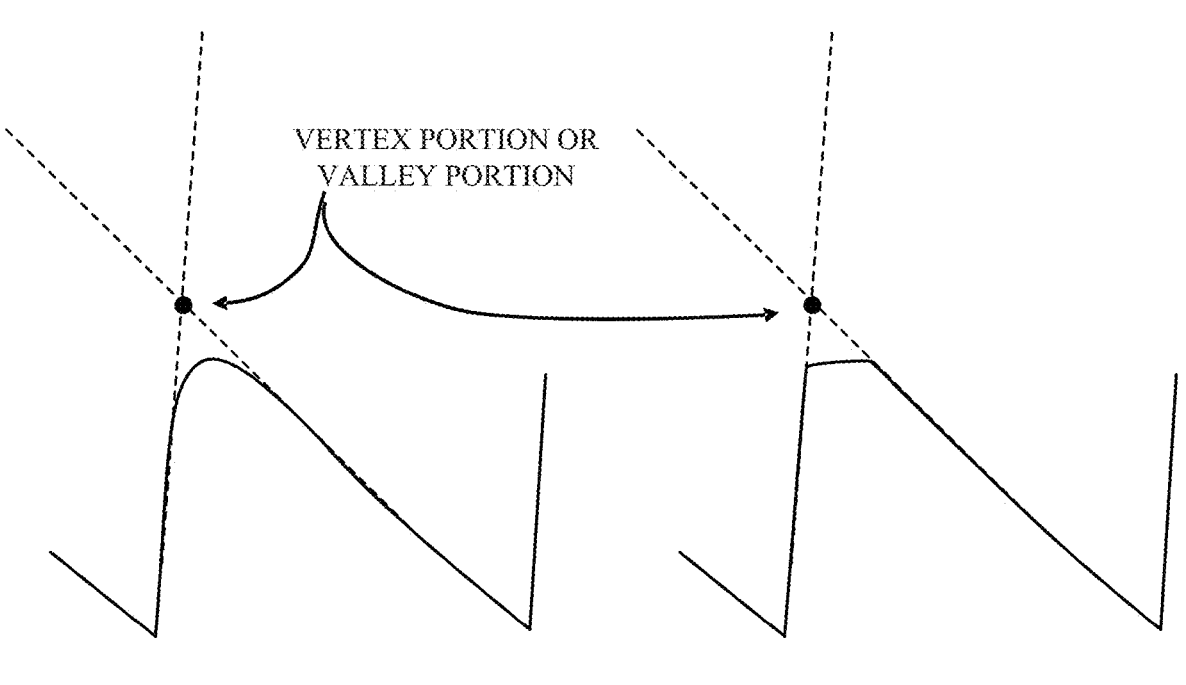
FIG. 9 is a schematic diagram illustrating the shape of a grating.

Referring now to FIG. 8, a description will be given of the grating height of the diffraction grating DO. In FIG. 8, a bending point of the diffraction grating DO on the first optical part MAT1 side is referred to as a valley portion, and its bending point on the second optical part MAT2 side is referred to as a vertex portion. As illustrated in FIG. 8, a grating height h for the central annulus is a distance on the optical axis between an envelope surface of its valley portion and a boundary portion of the diffraction grating DO, and the grating height h for any other annulus is the distance between its valley portion and the corresponding vertex portion. In each example, the average of the grating height h over all annuli is defined as the average grating height H of the diffraction grating DO. It is difficult to produce vertex and valley portions with a complete acute angle, and the vertex and valley portions are rounded to some extent in reality. In such a case, a point on an extended line from each surface of the grating is regarded as a vertex portion or a valley portion as illustrated in FIG. 9.

In a case where the value becomes lower than the lower limit of the inequality (1), the number of gratings of the diffraction grating DO decreases and sufficient aberration correction is difficult to achieve. Furthermore, the gratings of the diffraction grating DO are lowered, a diffraction flare amount increases, and image quality degrades. In a case where the value becomes higher than the upper limit of the inequality (1), a mold processing amount (machining amount) in producing a mold for transferring the diffraction grating DO increases, and abrasion and wear of a machining tool that engraves the diffraction grating DO on the mold increase.

Inequality (1) may be replaced with inequality (1a) below:

$$1500 < H \times N < 8000 \tag{1a}$$

Inequality (1) may be replaced with inequality (1b) below:

$$1800 < H \times N < 7900 \tag{1b}$$

A description will be given of configurations that may be satisfied by the observation optical system 10 according to each example.

In a case where the polarization-selective half-transmissive reflective element is a film element (for example, "WGF (registered trademark)" manufactured by Asahi Kasei Corporation), it is difficult to highly accurately bond such a film element on the diffraction grating DO. Thus, in the observation optical system 10 according to each example, the diffraction grating DO may be formed on a surface different from a polarization-selective half-transmissive reflective surface.

The second optical material may be thermoplastic resin (for example, Iupizeta (registered trademark) manufactured by Mitsubishi Gas Chemical Company, Inc., OKP (registered trademark) manufactured by Osaka Gas Chemicals Co., Ltd, or Panlite (registered trademark) manufactured by Teijin Limited). Thereby, an optical element including the diffraction grating DO by mold injection or the like can be easily manufactured.

The first optical material may be a light curable resin. Thereby, the diffraction grating DO having a high diffraction efficiency can be easily manufactured by applying the first optical material yet to be cured onto the second optical material and curing the applied first optical material. That is, it is not needed to prepare two molds in grating shapes, which are highly difficult to produce, and the diffraction grating DO can be manufactured with one grating shape mold only.

The observation optical system 10 according to each example may have a half view angle equal to or larger than 35°. Thereby, the observation optical system 10 can provide a higher realistic feeling.

The observation optical system 10 according to each example may have an overall length OAL equal to or shorter than 40 mm. The overall length OAL is a distance from an optical surface closest to the pupil except for the pupil surface SP to the image display surface ID. The overall length OAL longer than 40 mm leads to inconvenience in a case where the observation optical system according to each example is mounted and used on an observation apparatus such as an HMD. Furthermore, parallax becomes large when an image of the outside is captured by a camera mounted on the front surface of the HMD and is displayed on the image display surface ID, and dizziness and discomfort are likely to occur. The overall length OAL may be equal to or shorter than 30 mm or equal to or shorter than 25 mm.

Coating with an inorganic thin film or the like may be provided on the cemented surface of the first optical part MAT1 and the second optical part MAT2 for improvement of reflection prevention and close contact, for example.

A description will now be given of conditions that may be satisfied by the observation optical system according to each example. The observation optical system according to each example may satisfy one or more of the following inequalities (2) to (14):

$$0.02 < n1 - n2 < 0.25 \qquad (2)$$

$$5 < v1 - v2 < 30 \qquad (3)$$

$$20 < d1 < 400 \qquad (4)$$

$$1.5 < d2 < 8.0 \qquad (5)$$

$$1.45 < n1 < 1.80 \qquad (6)$$

$$1.40 < n2 < 1.73 \qquad (7)$$

$$25 < v1 < 50 \qquad (8)$$

$$18 < v2 < 35 \qquad (9)$$

$$15 < pmin < 100 \qquad (10)$$

$$2 < \theta t < 40 \qquad (11)$$

$$abs(-5 + ht) < \theta t < 10 + 1.5 \ ht \qquad (12)$$

$$0.03 < H \times N/rdiff < 0.90 \qquad (13)$$

$$0.5 \le OAL/rdiff \le 1.5 \qquad (14)$$

Here, n1 is the refractive index of the first optical material, n2 is the refractive index of the second optical material, v1 is the Abbe number of the first optical material, v2 is the Abbe number of the second optical material, d1 [μm] is the thickness of the first optical part MAT1 in the optical axis direction, d2 [mm] is the thickness of the second optical part MAT2 in the optical axis direction, and pmin [μm] is the minimum grating pitch of the diffraction grating DO. The grating pitch is the distance between straight lines parallel to the optical axis and passing through adjacent valley portions as illustrated in FIG. 8. However, the grating pitch for the central annulus is the distance between the optical axis and a straight line passing through a valley portion. The minimum grating pitch pmin is the minimum value of the grating pitch. The angle θt is a taper angle [° ] of the diffraction grating DO relative to the optical axis. As illustrated in FIG. 8, the taper angle θt is the angle between a straight line parallel to the optical axis and a straight line connecting a valley portion and the corresponding vertex portion on the second optical part MAT2 side with a direction departing from the optical axis taken as the positive direction. The taper angle θt may be different or the same for each diffraction grating DO. The value h (t) [mm] is the distance of the diffraction grating DO from the optical axis in the radial direction. The function abs(x) indicates the absolute value of x. The value rdiff [mm] is the radius of an effective area of the diffraction grating DO.

In a case where the value becomes lower than the lower limit of the inequality (2), the refractive index difference decreases and the grating height needs to be increased, and it becomes difficult to obtain a favorable angle characteristic of the diffraction grating DO. In a case where the value becomes higher than the upper limit of the inequality (2), only a limited number of materials are available and such a material potentially has a large haze or brittleness.

In a case where the value becomes lower than the lower limit of the inequality (3), it is difficult to obtain high diffraction efficiency in a wavelength band with wide dispersion. In a case where the value becomes higher than the upper limit of the inequality (3), the freedom of material selection decreases.

In a case where the value becomes lower than the lower limit of the inequality (4), the shape of the diffraction grating DO is transferred onto a surface and scattering and diffraction that lead to image degradation potentially occur. In a case where the value becomes higher than the upper limit of the inequality (4), the volume of the first optical part MAT1 is potentially large.

In a case where the inequality (5) is satisfied, the second optical material has not only a diffraction effect but also a refraction effect and an observation optical system can efficiently correct aberration with a smaller number of lenses and have a small size and high image quality. In a case where the value becomes lower than the lower limit of the inequality (5), for example, the strength of an element is insufficient and deflection is likely to occur. Furthermore, the second optical part MAT2 is too thin and unlikely to have a sufficient refraction effect. In a case where the value becomes higher than the upper limit of the inequality (5), it is potentially difficult to to transfer the grating shape from a mold onto the material. For example, in a case where the diffraction grating DO is formed at the second optical part MAT2 by mold injection, the mold shape cannot be sufficiently transferred unless molding is performed at higher pressure as the second optical part MAT2 is thicker. Such high-pressure molding causes problems of increase in the device size and earlier mold damage, for example.

In a case where the value becomes lower than the lower limit of the inequality (6), the refractive index of the second optical material potentially needs to be further lowered. However, such a material has an increased volume ratio of air and is brittle. In a case where the value becomes higher than the upper limit of the inequality (6), the material contains a large number of inorganic atoms and thus has a large weight and is potentially brittle.

In a case where the value becomes lower than the lower limit of the inequality (7), the second optical part MAT2 has an increased volume ratio of air and is potentially brittle. In a case where the value becomes higher than the upper limit of the inequality (7), the first optical material is potentially required to have a higher refractive index. Such a material contains a large number of inorganic atoms and thus has a large weight and is potentially brittle.

In a case where the value becomes lower than the lower limit of the inequality (8), the second optical material potentially needs to be extremely highly dispersive and diffraction efficiency potentially cannot be maintained high in the entire visible range. In a case where the value becomes higher than the upper limit of the inequality (8), the refractive index is low, and unless the refractive index of the second optical material is lowered as well, the grating height is high and it is potentially difficult to fabricate a mold for forming the grating.

In a case where the value becomes lower than the lower limit of the inequality (9), the chromatic aberration of the observation optical system 10 is potentially large. In a case where the value becomes higher than the upper limit of the inequality (9), the dispersion difference from the first optical material decreases and diffraction efficiency cannot be maintained high in the entire visible range, and accordingly, flare due to the diffraction grating DO occurs and image quality potentially degrades.

In a case where the value becomes lower than the lower limit of the inequality (10), the grating pitch decreases and it is potentially difficult to produce a mold used to mold the diffraction grating DO. More specifically, in a case where a mold is fabricated by machining to produce a part to be a valley portion of the diffraction grating DO, a machining bite contacts an adjacent grating. In a case where the value becomes higher than the upper limit of the inequality (10), aberration correction by the diffraction grating DO is not sufficiently performed and image quality potentially cannot be increased.

In a case where the value becomes lower than the lower limit of the inequality (11), the taper angle for removal is insufficient and it is potentially difficult to demold a material from a mold in a case where the diffraction grating DO is molded. In a case where the value becomes higher than the upper limit of the inequality (11), the angle between light from the image display element 20 and a wall surface of the diffraction grating DO is large and a phase provided to the light by a annulus is potentially largely shifted from $2\pi$. As a result, diffraction efficiency decreases and image quality potentially degrades.

In a case where the value becomes lower than the lower limit of the inequality (12), the taper angle for removal is insufficient and it is potentially difficult to demold a material from a mold in a case where the diffraction grating DO is molded. In a case where the value becomes higher than the upper limit of the inequality (12), the angle between light from the image display element 20 and a wall surface of the diffraction grating DO is large and a phase provided to the light by a annulus is potentially largely shifted from $2\pi$. As a result, diffraction efficiency decreases and image quality potentially degrades.

In a case where the value becomes lower than the lower limit of the inequality (13), the number of gratings of the diffraction grating DO decreases and sufficient aberration correction is difficult to achieve, and accordingly, image quality potentially degrades. In a case where the value becomes higher than the upper limit of the inequality (13), gratings need to be highly densely fabricated at production of a mold for transferring the diffraction grating DO, and accordingly, heat generation at a machining tool that engraves gratings on a mold increases and it is potentially difficult to fabricate a desired shape on the mold. Furthermore, a narrow machining tool with relatively low strength potentially needs to be used to fabricate a minute shape, and accordingly, for example, abrasion and wear of a machining tool potentially increase and deflection of the machining tool potentially increases.

In a case where the value becomes lower than the lower limit of the inequality (14), heat generated at the image display element 20 is likely to be conducted to a user and potentially provides a discomfort feeling to the user. In a case where the value becomes higher than the upper limit of the inequality (14), the distance of the barycenter of the observation optical system 10 or a holding unit thereof from the user increases and a load on the user potentially increases.

Inequalities (2) to (14) may be replaced with inequalities (2a) to (14a) below:

$$0.03 < n1 - n2 < 0.15 \tag{2a}$$

$$6 < \nu1 - \nu2 < 20 \tag{3a}$$

$$50 < d1 < 350 \tag{4a}$$

$$2.0 < d2 < 7.0 \tag{5a}$$

$$1.50 < n1 < 1.75 \tag{6a}$$

$$1.50 < n2 < 1.65 \tag{7a}$$

$$30 < \nu1 < 45 \tag{8a}$$

$$20 < \nu2 < 33 \tag{9a}$$

$$16 < pmin < 80 \tag{10a}$$

$$2 < \theta t < 35 \tag{11a}$$

$$\mathrm{abs}(-5 + ht) < \theta t < 5 + 1.5\ ht \tag{12a}$$

$$0.05 < H \times N / rdiff < 0.70 \tag{13a}$$

$$0.6 \le OAL / rdiff \le 1.4 \tag{14a}$$

Inequalities (2) to (14) may be replaced with inequalities (2b) to (14b) below:

$$0.04 < n1 - n2 < 0.10 \tag{2b}$$

$$7 < \nu1 - \nu2 < 19 \tag{3b}$$

$$70 < d1 < 320 \tag{4b}$$

$$3.0 < d2 < 6.0 \tag{5b}$$

$$1.60 < n1 < 1.70 \tag{6b}$$

$$1.55 < n2 < 1.66 \tag{7b}$$

$$35 < \nu1 < 42 \tag{8b}$$

$$21 < \nu2 < 31 \tag{9b}$$

$$17 < pmin < 60 \tag{10b}$$

$$2 < \theta t < 30 \tag{11b}$$

-continued $$abs(-5 + ht) < \theta t < 1.5 \ ht \qquad (12b)$$

$$0.07 < H \times N/rdiff < 0.60 \qquad (13b)$$

$$0.7 \le OAL/rdiff \le 1.3 \qquad (14b)$$

The following inequality may be satisfied:

$$3 < H < 15 \qquad (15)$$

In a case where the value becomes lower than the lower limit of the inequality (15), the number of gratings of the diffraction grating DO decreases and sufficient aberration correction is difficult to achieve. Furthermore, the gratings of the diffraction grating DO are lowered, a diffraction flare amount increases, and image quality degrades. In a case where the value becomes higher than the upper limit of the inequality (15), a mold processing amount (machining amount) in producing a mold for transferring the diffraction grating DO increases, and abrasion and wear of a machining tool that engraves the diffraction grating DO on the mold increase.

A description will now be given of numerical examples 1 to 3 corresponding to Examples 1 to 3, respectively, and a comparative example.

In surface data of each numerical example, r represents a curvature radius of an optical surface, d (mm) represents an on-axis distance (distance on the optical axis) between m-th and (m+1)-th surfaces, where m is a surface number counted from the pupil surface SP side. nd is a refractive index of each optical member for the d-line, and vd is an Abbe number of each optical member. The Abbe number vd of a material expressed by the following expression $$vd = (Nd - 1)/(NF - NC)$$

where Nd, NF, and NC are refractive indices for the d-line (587.6 nm), the F-line (486.1 nm), and the C-line (656.3 nm) in the Fraunhofer line. The effective diameter is the maximum radius of an area of each optical surface through which light from an original passes.

In a case where an optical surface is aspherical, an asterisk * is attached to the right side of its surface number. An aspherical surface shape is expressed as follows:

$$x(h) = \cfrac{\left(\cfrac{h^2}{r}\right)}{1 + \sqrt{\left\{1 - (1+k)\left(\cfrac{h}{r}\right)^2\right\}}} + A_4h^4 + A_6h^6 + A_8h^8 + A_{10}h^{10} + \cdots$$

where x is a displacement amount from a surface vertex in the optical axis direction, h is a height from the optical axis in a direction orthogonal to the optical axis, R is a paraxial curvature radius, K is a conic constant, and A4, A6, A8, and A10 are aspherical surface coefficients of respective orders. In each aspherical surface coefficient, "e±XX" means "×10^{±XX}".

Various data also include a focal length (mm), an F-number, a half view angle (°), and an image height (mm). The overall lens length is the sum of the eye relief and the overall length OAL of the observation optical system 10, which is different from the overall length OAL of the observation optical system 10.

A phase shape F(h, m) of a diffractive optical element at a distance h from the optical axis in the radial direction is expressed as follows:

$$F(h, m) = (2\pi/m\lambda 0)(C1h2 + C2h4 + C3h6 \ \ldots)$$

where m is a diffraction order, $\lambda 0$ is a reference wavelength, and C2i (where i is a natural number) is a phase coefficient of a 2i-th order term. In this case, refractive power $\phi$ of a diffraction surface of the diffractive optical element for an optional wavelength $\lambda$ and an optional diffraction order m is expressed by the following equation and a phase coefficient C1.

$$\phi(\lambda, m) = -2C1m\lambda/\lambda 0$$

In each example, the diffraction order m of diffracted light is one and the design wavelength $\lambda 0$ is 530 nm. In each example, the first optical material is acrylic or thiol-containing acrylic UV curable resin, and the second optical material is polycarbonate or polyester thermoplastic polymer.

Numerical Example 1

| UNIT: mm SURFACE DATA | | | | | |
|---|---|---|---|---|---|
| Surface No. | r | d | nd | vd | Effective Diameter |
| 1 (Pupil Surface) | ∞ | 13.407 | | | 6.00 |
| 2* | −57.7009 | 0.100 | 1.64500 | 38.0 | 25.80 |
| 3 (Diffraction) | −57.7009 | 3.086 | 1.58800 | 28.8 | 25.92 |
| 4* | −28.9230 | 1.517 | | | 28.65 |
| 5* | −27.7090 | 8.058 | 1.54390 | 56.0 | 29.64 |
| 6* | −26.7625 | −8.058 | | | 36.57 |
| 7* | −27.7090 | 8.058 | | | 27.95 |
| 8* | −26.7625 | 1.501 | | | 28.03 |
| 9 | ∞ | 0.281 | 1.49170 | 57.4 | 40.00 |
| 10 | ∞ | 0.700 | 1.51680 | 64.2 | 40.00 |
| 11 | ∞ | 0.000 | | | 40.00 |
| Image Plane | ∞ | | | | |

ASPHERIC DATA

2nd Surface

K = 0.00000e+00, A4 = 1.82499e−05, A6 = −9.79039e−08
3rd Surface

K = 0.00000e+00, A4 = 1.82499e−05, A6 = −9.79039e−08
3rd Surface (Diffractive Surface)

C1 = −1.65617e−04, C2 = −2.69629e−06,
C3 = −1.19358e−09, C4 = 4.92304e−11
4th Surface K = −1.11177e+01, A4 = 6.08389e−06, A6 = −3.46120e−08
5th Surface K = 0.00000e+00, A4 = 2.53772e−05,
A6 = −7.77715e−08, A8 = 1.53979e−10
6th Surface -continued

| K = −4.43080e+00, A4 = −2.80832e−05, A6 = 4.93994e−08, A8 = −1.11631e−10, A10 = 9.84584e−14 |
| 7th Surface |

| K = 0.00000e+00, A4 = 2.53772e−05, A6 = −7.77715e−08, A8 = 1.53979e−10 |
| 8th Surface |

| K = −4.43080e+00, A4 = −2.80832e−05, A6 = 4.93994e−08, A8 = −1.11631e−10, A10 = 9.84584e−14 |

| | |
|---|---|
| Focal Length | 15.681 |
| Fno | 2.614 |
| Half Angle of View(°) | 46.245 |
| Image Height | 11.584 |
| Overall Lens Length | 44.766 |
| BF | 0.000 |
| Object Distance (from 1st Surface) | 1612.000 |
| Entrance Pupil Position | 0.000 |
| Exit Pupil Position | 108.822 |
| Front Principal-Point Position | 17.944 |
| Rear Principal-Point Position | −15.529 |

Single Lens Data

| Lens | Starting Surface | Focal Length |
|---|---|---|
| 1 | 1 | 2948.392 |
| 2 | 3 | 90.996 |
| 3 | 5 | 356.911 |
| 4 | 6 | 356.911 |
| 5 | 7 | 356.911 |
| 6 | 9 | 0.000 |
| 7 | 10 | 0.000 |

Numerical Example 2

UNIT: mm
SURFACE DATA

| Surface No. | r | d | nd | vd | Effective Diameter |
|---|---|---|---|---|---|
| 1 (Pupil Surface) | ∞ | 11.846 | | | 6.00 |
| 2* | 249.8967 | 0.100 | 1.67000 | 40.0 | 25.75 |
| 3 (Diffraction) | 249.8967 | 2.943 | 1.61000 | 30.0 | 25.83 |
| 4* | −58.5295 | 1.385 | | | 27.37 |
| 5* | −26.8828 | 1.987 | 1.63550 | 23.9 | 28.68 |
| 6* | −20.7501 | 4.662 | 1.54390 | 56.0 | 30.76 |
| 7* | −23.8851 | −4.662 | | | 33.17 |
| 8* | −20.7479 | −1.987 | 1.63550 | 23.9 | 34.15 |
| 9* | −26.8828 | 1.987 | | | 35.60 |
| 10* | −20.7501 | 4.662 | 1.54390 | 56.0 | 33.95 |
| 11* | −23.8851 | 1.500 | | | 32.74 |
| 12 | ∞ | 0.281 | 1.49170 | 57.4 | 40.00 |
| 13 | ∞ | 0.700 | 1.51680 | 64.2 | 40.00 |
| 14 | ∞ | 0.000 | | | 40.00 |
| Image Plane | ∞ | | | | |

ASPHERIC DATA

| 2nd Surface |

| K = 0.00000e+00, A4 = −3.58936e−05, A6 = 1.74583e−07 |
| 3rd Surface |

| K = 0.00000e+00, A4 = −3.58936e−05, A6 = 1.74583e−07 |
| 3rd Surface (Diffractive Surface) |

| C1 = −3.81126e−04, C2 = −1.02216e−05, C3 = 2.96486e−08 |
| 4th Surface |

| K = 2.03706e+00, A4 = 2.88105e−05, A6 = −3.18881e−07, A8 = 1.52497e−09 |

| 5th Surface |

| K = 0.00000e+00, A4 = 6.71268e−05, A6 = −7.96586e−08, A8 = 1.17429e−10, A10 = 5.76658e−14 |
| 6th Surface |

| K = −2.23063e+00, A4 = 5.55829e−05 |
| 7th Surface |

| K = −7.99529e+00, A4 = −6.31775e−05, A6 = 3.31864e−07, A8 = −1.00793e−09, A10 = 1.75581e−12 |
| 8th Surface |

| K = −2.23063e+00, A4 = 5.55829e−05 |
| 9th Surface |

| K = 0.00000e+00, A4 = 6.71268e−05, A6 = −7.96586e−08, A8 = 1.17429e−10, A10 = 5.76658e−14 |
| 10th Surface |

| K = −2.23063e+00, A4 = 5.55829e−05 |
| 11th Surface |

| K = −7.99529e+00, A4 = −6.31775e−05, A6 = 3.31864e−07, A8 = −1.00793e−09, A10 = 1.75581e−12 |

| | |
|---|---|
| Focal Length | 13.208 |
| Fno | 2.201 |
| Half Angle of View(°) | 45.230 |
| Image Height | 8.761 |
| Overall Lens Length | 38.699 |
| BF | 0.000 |
| Object Distance (from 1st Surface) | 1612.000 |
| Entrance Pupil Position | 0.000 |
| Exit Pupil Position | 54.276 |
| Front Principal-Point Position | 16.428 |
| Rear Principal-Point Position | −13.099 |

Single Lens Data

| Lens | Starting Surface | Focal Length |
|---|---|---|
| 1 | 1 | 1311.361 |
| 2 | 3 | 72.931 |
| 3 | 5 | 125.190 |
| 4 | 6 | −609.355 |
| 5 | 7 | −608.395 |
| 6 | 8 | 125.137 |
| 7 | 9 | 125.190 |
| 8 | 10 | −609.355 |
| 9 | 12 | 0.000 |
| 10 | 13 | 0.000 |

Numerical Example 3

UNIT: mm
SURFACE DATA

| Surface No. | r | d | nd | vd | Effective Diameter |
|---|---|---|---|---|---|
| 1 (Pupil Surface) | ∞ | 19.200 | | | 6.00 |
| 2* | 795.8416 | 0.300 | 1.69300 | 40.0 | 38.65 |
| 3 (Diffraction) | 795.8416 | 4.021 | 1.65000 | 22.0 | 38.95 |
| 4* | −60.2903 | 1.497 | | | 41.03 |
| 5* | −52.7431 | 10.129 | 1.54390 | 56.0 | 42.45 |
| 6* | −40.0069 | −10.129 | | | 50.72 |
| 7* | −52.7431 | 10.129 | | | 42.10 |
| 8* | −40.0069 | 1.500 | | | 40.48 |
| 9 | ∞ | 0.281 | 1.49170 | 57.4 | 40.00 |
| 10 | ∞ | 0.700 | 1.51680 | 64.2 | 40.00 |
| 11 | ∞ | 0.000 | | | 40.00 |
| Image Plane | ∞ | | | | |

-continued

ASPHERIC DATA

2nd Surface

K = 0.00000e+00, A4 = −2.46413e−05, A6 = 3.83992e−08
3rd Surface

K = 0.00000e+00, A4 = −2.46413e−05, A6 = 3.83992e−08
3rd Surface (Diffractive Surface)

C1 = −6.54114e−04, C2 = −1.97938e−06,
C3 = 5.55812e−09, C4 = −2.81289e−12
4th Surface K = 0.00000e+00, A4 = −1.81017e−05, A6 = 4.78386e−08
5th Surface K = 0.00000e+00, A4 = −3.41288e−06,
A6 = 1.28328e−08, A8 = −6.29336e−12
6th Surface K = −6.59266e+00, A4 = −1.29309e−05, A6 = 1.11361e−08,
A8 = −1.41789e−11, A10 = 8.40064e−15
7th Surface K = 0.00000e+00, A4 = −3.41288e−06,
A6 = 1.28328e−08, A8 = −6.29336e−12
8th Surface K = −6.59266e+00, A4 = −1.29309e−05,
A6 = 1.1136le−08, A8 = −1.41789e−11,
A10 = 8.40064e−15

| | |
|---|---|
| Focal Length | 19.237 |
| Fno | 3.206 |
| Half Angle of View(°) | 44.802 |
| Image Height | 13.389 |
| Overall Lens Length | 57.886 |
| BF | 0.000 |
| Object Distance (from 1st Surface) | 1612.000 |
| Entrance Pupil Position | 0.000 |
| Exit Pupil Position | 54.449 |
| Front Principal-Point Position | 26.062 |
| Rear Principal-Point Position | −19.006 |

Single Lens Data

| Lens | Starting Surface | Focal Length |
|---|---|---|
| 1 | 1 | 764.432 |
| 2 | 3 | 76.737 |
| 3 | 5 | 236.275 |
| 4 | 6 | 236.275 |
| 5 | 7 | 236.275 |
| 6 | 9 | 0.000 |
| 7 | 10 | 0.000 |

Comparative Example

UNIT: mm
SURFACE DATA

| Surface No. | r | d | nd | vd | Effective Diameter |
|---|---|---|---|---|---|
| 1 (Pupil Surface) | ∞ | 12.000 | | | 6.00 |
| 2* | 414.2717 | 2.635 | 1.63550 | 23.9 | 28.96 |
| 3* | −111.1267 | 1.912 | | | 31.35 |
| 4 | ∞ | 6.500 | 1.54390 | 56.0 | 38.39 |
| 5* | −46.6652 | −6.500 | | | 40.89 |
| 6 | ∞ | −1.912 | | | 39.64 |
| 7* | −111.1267 | 1.912 | | | 37.00 |
| 8 | ∞ | 6.500 | 1.54390 | 56.0 | 34.62 |
| 9* | −46.6652 | 1.545 | | | 32.52 |

-continued

| | | | | | |
|---|---|---|---|---|---|
| 10 | ∞ | 0.281 | 1.49170 | 57.4 | 40.00 |
| 11 | ∞ | 0.700 | 1.51680 | 64.2 | 40.00 |
| 12 | ∞ | 0.000 | | | 40.00 |
| Image Plane | ∞ | | | | |

ASPHERIC DATA

2nd Surface

K = 0.00000e+00, A4 = 2.83587e−06,
A6 = −5.07475e−09, A8 = −1.36718e−10
3rd Surface K = 0.00000e+00, A4 = 1.18732e−05, A6 = −1.17170e−08
5th Surface K = −9.55407e−01, A4 = 9.08921e−08, A6 = 5.01351e−09,
A8 = −2.17939e−11, A10 = 2.09274e−14
7th Surface K = 0.00000e+00, A4 = 1.18732e−05, A6 = −1.17170e−08
9th Surface K = −9.55407e−01, A4 = 9.08921e−08, A6 = 5.01351e−09,
A8 = −2.17939e−11, A10 = 2.09274e−14

| | |
|---|---|
| Focal Length | 15.908 |
| Fno | 2.651 |
| Half Angle of View(°) | 50.021 |
| Image Height | 11.553 |
| Overall Lens Length | 42.399 |
| BF | 0.000 |
| Object Distance (from 1st Surface) | 1612.000 |
| Entrance Pupil Position | 0.000 |
| Exit Pupil Position | 62.962 |
| Front Principal-Point Position | 19.937 |
| Rear Principal-Point Position | −15.750 |

Single Lens Data

| Lens | Starting Surface | Focal Length |
|---|---|---|
| 1 | 1 | 136.182 |
| 2 | 4 | 85.270 |
| 3 | 5 | 85.270 |
| 4 | 8 | 85.270 |
| 5 | 10 | 0.000 |
| 6 | 11 | 0.000 |

Figure 10:
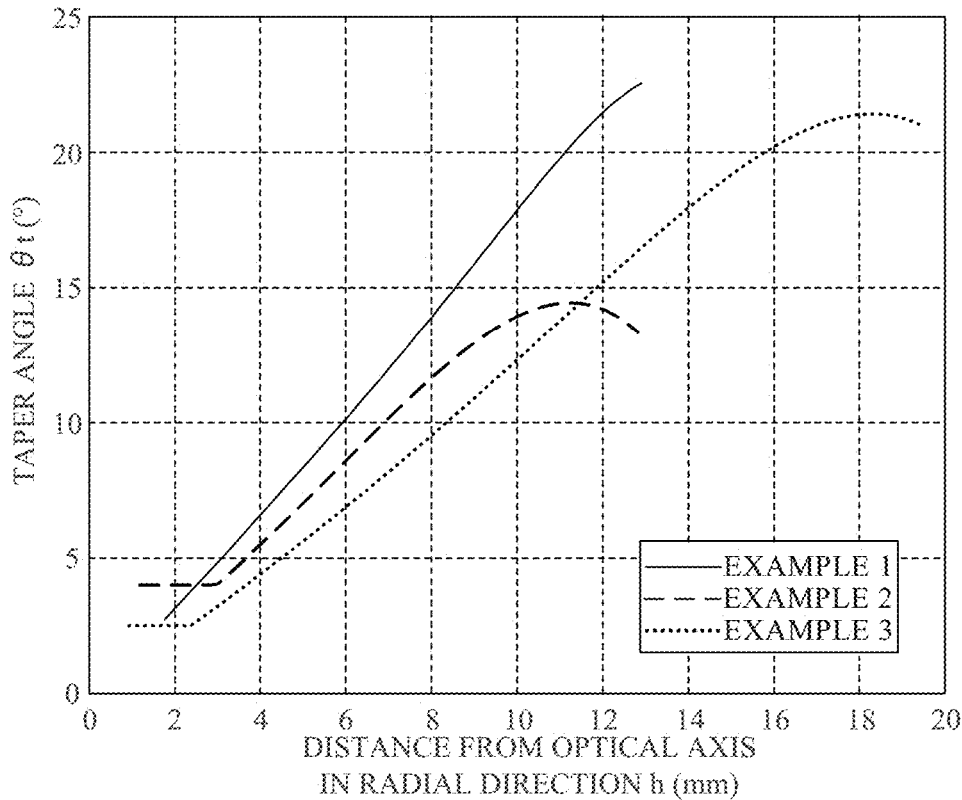
FIG. 10 illustrates taper angles in numerical examples.

Table 1 below summarizes various values in each numerical example. FIG. 10 collectively illustrates their taper angles θt.

TABLE 1

| | Example 1 | Example 2 | Example 3 |
|---|---|---|---|
| n1-n2 | 0.057 | 0.060 | 0.043 |
| v1-v2 | 9.2 | 10 | 18 |
| d1 (mm) | 0.1 | 0.1 | 0.3 |
| d2 (mm) | 3.1 | 2.94 | 4.02 |
| H (μm) | 13.7 | 8.986 | 14.405 |
| N | 135.0 | 325 | 542 |
| H × N (μm) | 1845 | 2920 | 7808 |
| n1 | 1.645 | 1.67 | 1.693 |
| n2 | 1.588 | 1.61 | 1.65 |
| v1 | 38.0 | 40 | 40 |
| v2 | 28.8 | 30 | 22 |
| pmin(um) | 52.3 | 19.6 | 21.3 |
| rdiff(mm) | 13.0 | 12.9 | 19.5 |
| H × N/rdiff | 0.1 | 0.2 | 0.40 |
| OAL(mm) | 15.2 | 12.6 | 18.4 |
| OAL/rdiff | 1.2 | 1.0 | 0.9 |
| Half Angle of Field (°) | 46.5 | 45 | 44.8 |

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide an optical system and a display apparatus that are thin and easy to manufacture and have high image quality.

This application claims the benefit of Japanese Patent Application No. 2022-209810, filed on Dec. 27, 2022, which is hereby incorporated by reference herein in its entirety.

What is claimed is:

1. An optical system through which a light beam from an image display element is guided to an exit pupil, the optical system comprising:

a first transmissive reflective surface and a second transmissive reflective surface that are disposed in order from an exit pupil side to an image display element side; and a first optical element and a second optical element that are disposed in order from the exit pupil side to the image display element side, wherein the first optical element includes a first optical part made of a first optical material, and a second optical part made of a second optical material different from the first optical material that are disposed in order from the exit pupil side to the image display element side, wherein the first optical part and the second optical part are cemented to each other and a diffraction grating is formed on a cemented surface of the first and second optical parts, and wherein the following inequality is satisfied:

$$1000 < H \times N < 10000$$

where H [μm] is an average grating height of the diffraction grating and N is the number of annuli of the diffraction grating.

2. The optical system according to claim 1, wherein the following inequality is satisfied:

$$0.02 < n1 - n2 < 0.25$$

where n1 is a refractive index of the first optical material, and n2 is a refractive index of the second optical material.

3. The optical system according to claim 1, wherein the following inequality is satisfied:

$$5 < v1 - v2 < 30$$

where v1 is an Abbe number of the first optical material, and v2 is an Abbe number of the second optical material.

4. The optical system according to claim 1, wherein the following inequality is satisfied:

$$20 < d1 < 400$$

where d1 [μm] is a thickness of the first optical part in an optical axis direction.

5. The optical system according to claim 1, wherein the following inequality is satisfied:

$$15 < d2 < 8.0$$

where d2 [mm] is a thickness of the second optical part in an optical axis direction.

6. The optical system according to claim 1, wherein the following inequality is satisfied:

$$1.45 < n1 < 1.80$$

where n1 is a refractive index of the first optical material.

7. The optical system according to claim 1, wherein the following inequality is satisfied:

$$140 < n2 < 173$$

where n2 is a refractive index of the second optical material.

8. The optical system according to claim 1, wherein the following inequality is satisfied:

$$25 < v1 < 50$$

where v1 is an Abbe number of the first optical material.

9. The optical system according to claim 1, wherein the following inequality is satisfied:

$$18 < v2 < 35$$

where v2 is an Abbe number of the second optical material.

10. The optical system according to claim 1, wherein the following inequality is satisfied:

$$15 < p\mathrm{min} < 100$$

where pmin [μm] is the minimum grating pitch of the diffraction grating.

11. The optical system according to claim 1, wherein the following inequality is satisfied:

$$3 < H < 15.$$

12. The optical system according to claim 1, wherein the following inequality is satisfied:

$$2 < \theta t < 40$$

where θt [°] is a taper angle of the diffraction grating relative to an optical axis.

13. The optical system according to claim 1, wherein the first optical material is light curable resin.

14. The optical system according to claim 1, wherein the second optical material is thermoplastic resin.

15. The optical system according to claim 1, wherein the following inequality is satisfied:

$$\mathrm{abs}(-5 + ht) < \theta t < 10 + 15ht$$

where $\theta t$ [$^\circ$ ] is a taper angle of the diffraction grating relative to an optical axis and ht [mm] is a distance of the diffraction grating from the optical axis in a radial direction.

16. The optical system according to claim 1, wherein the following inequality is satisfied:

$$0.03 < H \times N/rdiff < 0.90$$

where rdiff [mm] is a radius of an effective area of the diffraction grating.

17. The optical system according to claim 1, wherein a half view angle is equal to or larger than 35°.

18. The optical system according to claim 1, wherein an overall length is equal to or smaller than 40 mm.

19. The optical system according to claim 1, wherein the diffraction grating is a brazed transmission diffraction grating.

20. A display apparatus comprising:

the optical system according to claim 1; and an image display element configured to display an image.

\* \* \* \* \*